Aug. 21, 1956     C. F. HENRY     2,759,701
FLUID TRANSMISSION MECHANISM
Filed April 11, 1952     2 Sheets-Sheet 1

INVENTOR.
*Charles F. Henry*
BY *Frease & Bishop*
ATTORNEYS

Aug. 21, 1956  C. F. HENRY  2,759,701
FLUID TRANSMISSION MECHANISM

Filed April 11, 1952  2 Sheets-Sheet 2

INVENTOR.
*Charles F. Henry*
BY
*Frease & Bishop*
ATTORNEYS

United States Patent Office 2,759,701
Patented Aug. 21, 1956

2,759,701

FLUID TRANSMISSION MECHANISM

Charles F. Henry, near Canton, Ohio

Application April 11, 1952, Serial No. 281,851

4 Claims. (Cl. 253—52)

The invention relates to fluid transmission, and has for an object the provision of simple and efficient fluid transmission mechanism.

Another object is to provide fluid transmission mechanism including a housing within which is journalled a turbine or driven wheel having substantially radial vanes thereon, fluid being pumped through a plurality of distributor pipes to tangentially disposed nozzles in the housing surrounding the turbine.

A further object is to provide such a fluid transmission mechanism in which relief ports are located through the turbine adjacent to the vanes for discharging fluid to the interior of the housing.

A still further object is to provide such a mechanism in which the fluid is discharged from the housing through a check valve into a reservoir or sump from which it is returned to the pump.

Another object of the invention is to provide fluid transmission mechanism of the character referred to in which a spring loaded piston or plunger valve is located within a distributor chamber into which distributor pipes communicate, and adapted to be operated by fluid pressure from the pump to control admission of fluid to the distributor pipes.

Figure 1:
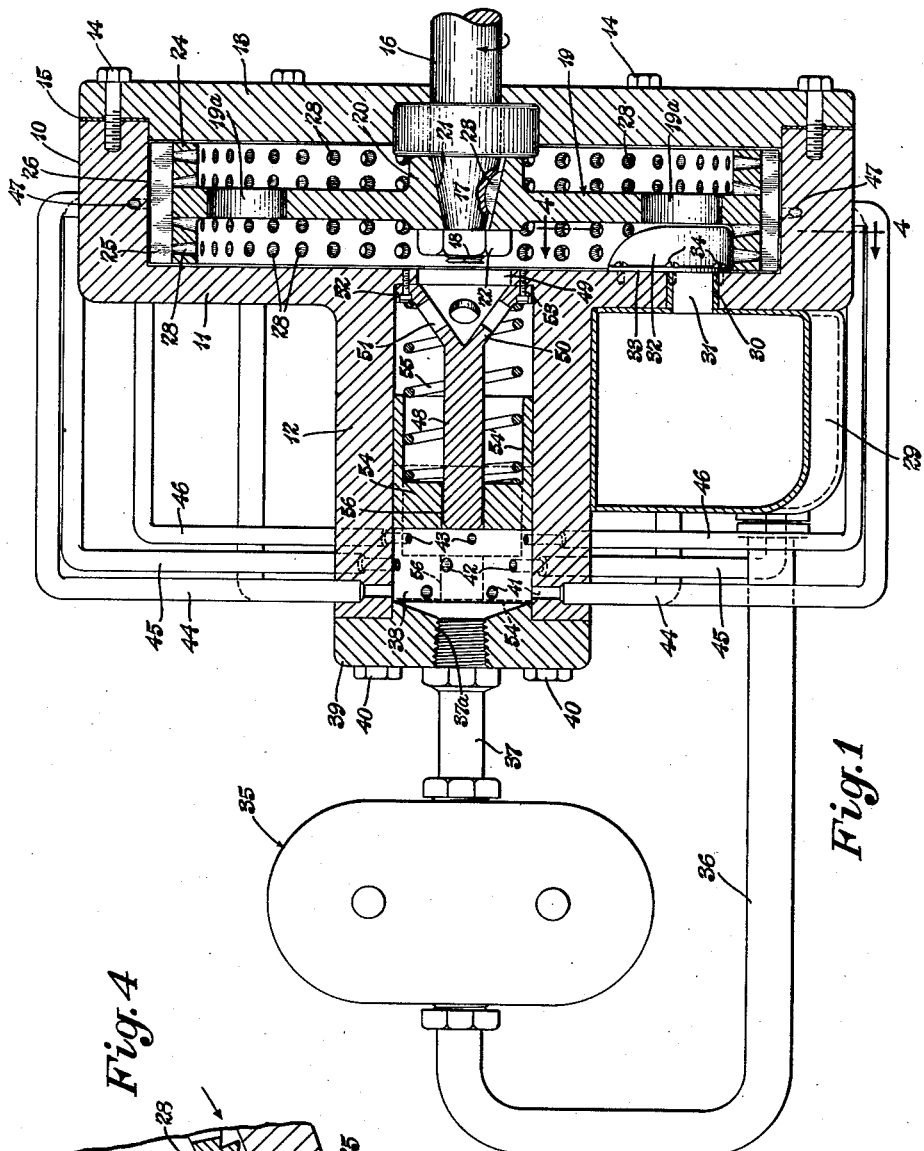
Figure 4:
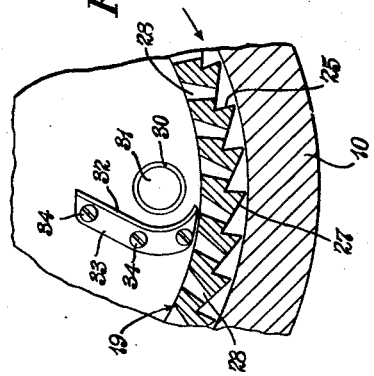
Figure 2:
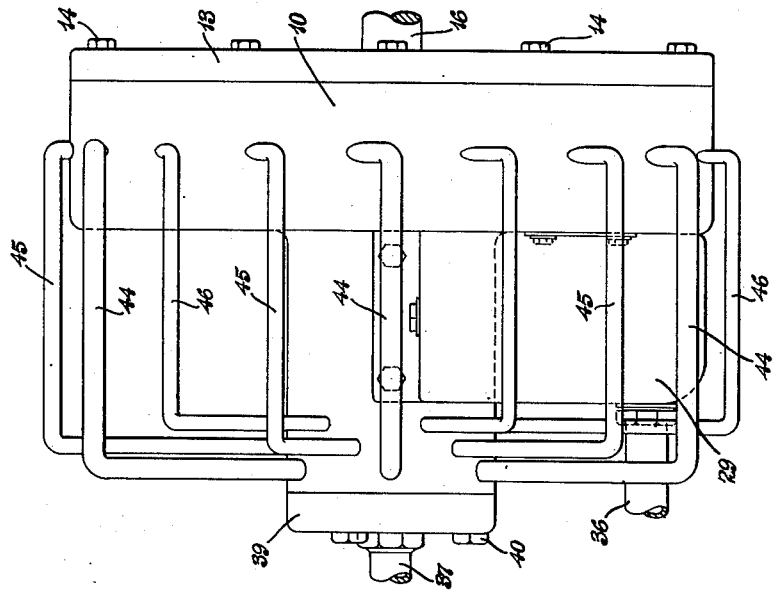
Figure 3:
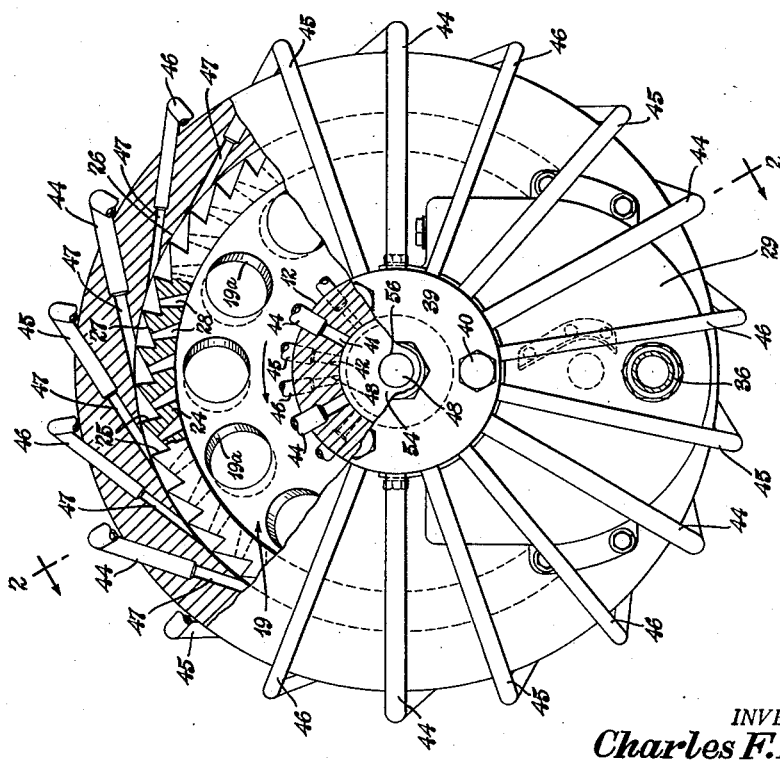

The above objects together with others which will be apparent from the drawings and following description, or which may be later referred to, may be attained by constructing the improved fluid transmission mechanism in the manner hereinafter described in detail and illustrated in the accompanying drawings, in which:

Fig. 1 is a vertical, longitudinal, sectional view through fluid transmission constructed in accordance with the invention, showing a fluid pump connected thereto;

Fig. 2 a side elevation of the fluid transmission mechanism with the pump removed, taken substantially on the line 2—2, Fig. 3;

Fig. 3, an end elevation of the mechanism shown in Fig. 2, with parts broken in section for the purpose of illustration; and Fig. 4 a fragmentary, sectional view taken as on the line 4—4, Fig. 1.

Referring now more particularly to the embodiment of the invention illustrated in the accompany drawings in which similar numerals refer to similar parts throughout, the mechanism is housed within a circular housing 10, having an integral side wall 11 terminating in the axially disposed cylindrical portion 12, providing a distributor chamber and valve casing, as will be later described in detail.

The other side of the housing may be closed by the adapter plate or head 13, detachably connected to the adjacent end of the housing 10 as by screws 14, a suitable gasket, as indicated at 15, or other usual means, being provided for providing a fluid-tight joint.

The driven shaft 16 is centrally located through the head or adapter plate 13 and journalled therein in any conventional manner. The inner end of the shaft 16 is preferably tapered as at 17 and terminates in the reduced, screw threaded end portion 18.

The turbine or driven wheel, indicated generally at 19, is provided with a hub portion 20, having the tapered opening 21 therein for receiving the tapered end portion 17 of the shaft 16, a nut 22 being located upon the threaded end 18 of the shaft for retaining the turbine thereon.

In order to hold the turbine against rotation relative to the shaft, a key 23 is provided as in usual practice. The turbine is provided with a peripheral rim 24, of a width substantially the width of the interior of the housing, around the periphery of which is formed a multiplicity of radial vanes or blades 25 extending substantially to the inner perimeter 26 of the housing, and joined by the inclined surfaces 27.

A plurality of inwardly flared relief ports 28 are located through the rim of the turbine, directly adjacent to each vane or blade 25 for a purpose to be later described.

Apertures 19a are formed in the turbine 19 at points between the hub 20 and rim flange 24, and are preferably angled as shown in Fig. 3 in order to facilitate the passage of fluid therethrough from the right side of the turbine, as viewed in Fig. 1, to the left side thereof.

A fluid reservoir or sump 29 may be mounted upon the outer face of the side wall 11 of the housing and communicates with the lower portion of the housing through the discharge port 30, within which is preferably located any conventional form of check valve mounted in the valve casing 31.

A baffle 32 is connected to the inner surface of the side wall 11 at one side of the discharge port 30 for the purpose of directing fluid from the interior of the housing to the discharge port. This baffle may have an angular flange 33 thereon for receiving screws 34 or the like by means of which it is attached to the inner surface of the side wall 11.

A fluid pump, indicated generally at 35, is adapted to be driven by any suitable type of prime mover (not shown) in conventional manner. This pump may be a gear pump, or other conventional type of fluid pump, and is provided for furnishing fluid under pressure to drive the turbine, as will be later described in detail.

A pipe 36 leads from the bottom of the reservoir or sump 27 to the intake side of the pump 35, and a pipe 37 leads from the discharge side of the pump to the distributor chamber 38, which is formed within the cylindrical portion 12 of the housing and closed by the distributor cap 39 attached to the outer end of the cylindrical portion 12, as by screws 40, or the like.

Successive series of discharge ports 41, 42 and 43 are located around the periphery of the distributor chamber 38, near the outer end thereof, and are connected by distributor pipes 44, 45 and 46 respectively, with the tangentially disposed nozzles 47, located through the peripheral walls of the housing 10, and directed toward the vanes 25 upon the turbine.

Preferably, as shown in the drawings, the first series of discharge ports 41 and communicating distributor pipes 44 are of larger diameter than the remaining discharge ports and distributor pipes, the innermost series of ports 43 and communicating pipes 46 being of smallest diameter, while the second series of ports 42 and pipes 45 are of an intermediate diameter.

An axially disposed valve pin or rod 48 is fixed to the inner end of the distributor chamber 38 and extends to a point slightly spaced from the innermost series of discharge ports 43. A port 49 is provided at the inner end of the chamber 38, providing communication with the interior of the housing 10.

In order to provide for mounting the valve pin 48 at this end of the chamber 38, without interfering with the port 49, the pin 48 may have a hollow, conical base 50, having openings 51 therein, and a rim flange 52, for connection to the side wall 11 of the housing, as by screws 53 or the like.

A piston or plunger valve 54 is slidably mounted in the chamber 38, and normally urged outwardly to the closed position, indicated in dotted lines in Fig. 1, by means of a coil spring 55, interposed between the inner end of the chamber 38 and the valve.

Preferably the valve 54 has the cylindrical skirt 54' extending inwardly therefrom, and the spring 55 extends into this skirt and against the head of the valve. An opening 56 is formed centrally in the head of the valve and adapted to have a sliding fit upon the valve pin or rod 48, when the valve is in the open position shown in full lines in Fig. 1.

In the operation of the above described fluid transmission mechanism, the spring 55 will normally urge the piston valve 54 to the closed position shown in dotted lines in Fig. 1, entirely closing the discharge ports 41, 42 and 43. At the same time the head of the valve is spaced from the outer end of the valve pin 48, so that the central aperture 56 thereof is out of engagement with the valve pin.

Thus, in idling position fluid from the pump 35, which enters the chamber 38, through the inlet pipe 37 and inlet port 37a, will pass through the aperture 56 in the valve and be discharged from the chamber 38, through the port 49 into the housing 10.

The piston valve 54 in this position entirely covers all of the discharge ports 41, 42 and 43, so that no fluid is admitted through the distributor pipes to the nozzles 47, and the turbine 19 remains stationary.

As the operation of the pump 35 is accelerated the volume of fluid entering the chamber 38 will increase, and as this volume of fluid becomes too great to permit all of the fluid to be discharged through the opening 56 in the valve 54, the fluid pressure will move the valve inwardly, or to the right as viewed in Fig. 1.

When the valve 54 has moved sufficiently to uncover the discharge ports 41 fluid under pressure will pass through said ports and enter the distributor pipes 44 and be discharged through the corresponding nozzles 47 against the radial vanes or blades 25, rotating the turbine 19 in the direction of the arrow in Fig. 3.

The fluid after impinging upon the vanes 25 will quickly pass through the relief ports 28 to the interior of the housing 10, and fluid will be passed from the right side of the turbine, as viewed in Fig. 1, through the apertures 19a to the left side thereof.

As the fluid collects in the lower side of the housing it will be directed, by the baffle 32, to the discharge port 30, and will be drawn through the check valve 31 and into the reservoir 29, by the suction of the pump, and will then be returned from the reservoir to the pump.

Further acceleration of the pump will force the valve 54 further inward, or to the right, uncovering next the discharge ports 42 and lastly the ports 43. As the valve moves to the position shown in full lines in Fig. 1, uncovering all of the discharge ports 41, 42 and 43, it will be seen that the valve pin 48 will have been received in the central opening 56 of the valve, entirely closing said opening and causing all of the fluid to be discharged through the discharge ports to the nozzles, rotating the turbine at maximum speed.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. Fluid transmission mechanism comprising a circular housing, having an outlet therein, a driven shaft journalled in the housing, a turbine fixed upon the shaft within the housing, a peripheral rim flange upon the turbine having radial vanes thereon located in proximity to the inner perimeter of the housing, there being relief ports in said rim flange adjacent to the vanes, means forming a concentric cylindrical distributor chamber communicating with one side of the housing, there being successive series of discharge ports in the outer end portion of the distributor chamber, a plurality of tangentially disposed nozzles located through the peripheral wall of the housing, a distributor pipe connecting each nozzle to one of the discharge ports, there being a fluid inlet at the outer end of said distributor chamber, a spring loaded plunger valve slidably located in the distributor chamber, said plunger valve having an axial port therein, an axial valve pin fixed to the inner end of the distributor chamber upon which the valve is slidable, said pin being adapted to be received in said axial port when all of said discharge ports are uncovered, said spring normally urging the valve to the outer end of the distributor chamber so as to close the discharge ports therein and to disconnect the valve from the valve pin so as to open the axial port in the valve, whereby at idling pressure fluid from said fluid inlet will pass through said axial port to the interior of the housing and thence to said outlet, and whereby at increased fluid pressure the valve will be moved inwardly successively opening said discharge ports in the distributor chamber and closing the axial port in the valve.

2. Fluid transmission mechanism comprising a circular housing, having an outlet therein, a driven shaft journalled in the housing, a turbine fixed upon the shaft within the housing, a peripheral rim flange upon the turbine having radial vanes thereon located in proximity to the inner perimeter of the housing, there being relief ports in said rim flange adjacent to the vanes, there being openings in the turbine at points spaced between the shaft and the rim flange so as to facilitate the passage of fluid from the housing to said outlet, means forming a concentric cylindrical distributor chamber communicating with one side of the housing, there being successive series of discharge ports in the outer end portion of the distributor chamber, a plurality of tangentially disposed nozzles located through the peripheral wall of the housing, a distributor pipe connecting each nozzle to one of the discharge ports, there being a fluid inlet at the outer end of said distributor chamber, a spring loaded plunger valve slidably located in the distributor chamber, said plunger valve having an axial port therein, an axial valve pin fixed to the inner end of the distributor chamber upon which the valve is slidable, said pin being adapted to be received in said axial port when all of said discharge ports are uncovered, said spring normally urging the valve to the outer end of the distributor chamber so as to close the discharge ports therein and to disconnect the valve from the valve pin so as to open the axial port in the valve, whereby at idling pressure fluid from said fluid inlet will pass through said axial port to the interior of the housing and thence to said outlet, and whereby at increased fluid pressure the valve will be moved inwardly successively opening said discharge ports in the distributor chamber and closing the axial port in the valve.

3. Fluid transmission mechanism comprising a circular housing, having an outlet therein, a driven shaft journalled in the housing, a turbine fixed upon the shaft within the housing, a peripheral rim flange upon the turbine having radial vanes thereon located in proximity to the inner perimeter of the housing, there being relief ports in said rim flange adjacent to the vanes, means forming a concentric cylindrical distributor chamber communicating with one side of the housing, there being successive series of discharge ports in the outer end portion of the distributor chamber, a plurality of tangentially disposed nozzles located through the peripheral wall of the housing, a distributor pipe connecting each nozzle to one of the discharge ports, there being a fluid inlet at the outer end of said distributor chamber, a spring loaded plunger valve slidably located in the distributor chamber, said plunger valve having an axial port therein, an axial valve pin fixed to the inner end of the distributor chamber upon which the valve is slidable, said pin being adapted to be received in said axial port when all of said discharge ports are uncovered, the inner end of said axial pin comprising a hollow cone having an opening therein, said spring normally urging the valve to the outer end of the distributor chamber so as to close the discharge ports therein and to disconnect the valve from the valve pin so as to open the axial port in the valve, whereby at idling pressure fluid from said fluid inlet will pass through said axial port to the interior of the housing and thence to said outlet, and whereby at increased fluid pressure the valve will be moved inwardly successively opening said discharge ports in the distributor chamber and closing the axial port in the valve.

4. Fluid transmission mechanism comprising a circular housing, having an outlet therein, a driven shaft journalled in the housing, a turbine fixed upon the shaft within the housing, a peripheral rim flange upon the turbine having radial vanes thereon located in proximity to the inner perimeter of the housing, there being relief ports in said rim flange adjacent to the vanes, there being openings in the turbine at points spaced between the shaft and the rim flange so as to facilitate the passage of fluid from the housing to said outlet, means forming a concentric cylindrical distributor chamber communicating with one side of the housing, there being successive series of discharge ports in the outer end portion of the distributor chamber, a plurality of tangentially disposed nozzles located through the peripheral wall of the housing, a distributor pipe connecting each nozzle to one of the discharge ports, there being a fluid inlet at the outer end of said distributor chamber, a spring loaded plunger valve slidably located in the distributor chamber, said plunger valve having an axial port therein, an axial valve pin fixed to the inner end of the distributor chamber upon which the valve is slidable, said pin being adapted to be received in said axial port when all of said discharge ports are uncovered, the inner end of said axial pin comprising a hollow cone having an opening therein, said spring normally urging the valve to the outer end of the distributor chamber so as to close the discharge ports therein and to disconnect the valve from the valve pin so as to open the axial port in the valve, whereby at idling pressure fluid from said fluid inlet will pass through said axial port to the interior of the housing and thence to said outlet, and whereby at increased fluid pressure the valve will be moved inwardly successively opening said discharge ports in the distributor chamber and closing the axial port in the valve.

References Cited in the file of this patent

UNITED STATES PATENTS

| Number | Name | Date |
| --- | --- | --- |
| 624,348 | Lighthall | May 2, 1899 |
| 700,744 | Curtis | May 27, 1902 |
| 705,890 | Zoelly | July 29, 1902 |
| 715,246 | Curtis | Dec. 9, 1902 |
| 794,898 | Stumpf | July 18, 1905 |
| 889,359 | Eastwood | June 2, 1908 |
| 1,043,480 | Sundh | Nov. 5, 1912 |
| 1,168,527 | MacKay | Jan. 18, 1916 |
| 1,990,872 | Lacy | Feb. 12, 1935 |
| 2,364,810 | Noxon | Dec. 12, 1944 |